United States Patent
Joos et al.

(10) Patent No.: US 10,164,278 B2
(45) Date of Patent: Dec. 25, 2018

(54) NITROGEN ENRICHED AIR GENERATION AND FUEL TANK INERTING SYSTEM

(71) Applicant: HYDROGENICS CORPORATION, Mississauga (CA)

(72) Inventors: Nathaniel Ian Joos, Mississauga (CA); Paolo Forte, Maple (CA)

(73) Assignee: HYDROGENICS CORPORATION, Mississauga (CA)

( * ) Notice: Subject to any disclaimer, the term of this patent is extended or adjusted under 35 U.S.C. 154(b) by 0 days.

(21) Appl. No.: 14/892,903

(22) PCT Filed: Mar. 7, 2014

(86) PCT No.: PCT/CA2014/050188
§ 371 (c)(1),
(2) Date: Nov. 20, 2015

(87) PCT Pub. No.: WO2014/186881
PCT Pub. Date: Nov. 27, 2014

(65) Prior Publication Data
US 2016/0118679 A1    Apr. 28, 2016

Related U.S. Application Data

(60) Provisional application No. 61/827,318, filed on May 24, 2013.

(51) Int. Cl.
*H01M 8/04089* (2016.01)
*H01M 8/0662* (2016.01)
(Continued)

(52) U.S. Cl.
CPC ............ *H01M 8/0662* (2013.01); *A62C 3/08* (2013.01); *B64D 37/32* (2013.01);
(Continued)

(58) Field of Classification Search
CPC .................. H01M 8/04089; H01M 8/0662
See application file for complete search history.

(56) References Cited

U.S. PATENT DOCUMENTS

| 4,362,789 A | 12/1982 | Dighe |
| 6,979,508 B2 | 12/2005 | Gurin et al. |

(Continued)

FOREIGN PATENT DOCUMENTS

| CA | 2812257 A1 | 4/2012 |
| CN | 1172392 C | 10/2004 |

(Continued)

OTHER PUBLICATIONS

European Patent Application No. 14801196.8, Supplementary European Search Report dated Sep. 23, 2016. 7 pages.
(Continued)

*Primary Examiner* — Olatunji Godo

(57) ABSTRACT

A fuel cell power module is used to provide nitrogen enriched air for, in one application, fuel tank inerting in an aircraft. The fuel cell power module has a recirculation line between its cathode side outlet and cathode side inlet. At least one controllable device is provided to allow the flow rate in the recirculation line to be controlled. The recirculation flow rate is adjusted such that the cathode exhaust has an oxygen concentration useful for inerting a fuel tank or suppressing fire.

14 Claims, 1 Drawing Sheet

(51) Int. Cl.
| | |
|---|---|
| *H01M 8/04537* | (2016.01) |
| *H01M 8/04746* | (2016.01) |
| *H01M 8/0432* | (2016.01) |
| *H01M 16/00* | (2006.01) |
| *A62C 3/08* | (2006.01) |
| *B64D 37/32* | (2006.01) |
| *H01M 8/04858* | (2016.01) |

(52) U.S. Cl.
CPC ....... *H01M 8/0432* (2013.01); *H01M 8/0488* (2013.01); *H01M 8/04089* (2013.01); *H01M 8/04097* (2013.01); *H01M 8/04544* (2013.01); *H01M 8/04559* (2013.01); *H01M 8/04753* (2013.01); *H01M 16/006* (2013.01); *H01M 8/04365* (2013.01); *H01M 8/04761* (2013.01)

(56) References Cited

U.S. PATENT DOCUMENTS

| | | | |
|---|---|---|---|
| 7,758,988 | B2 | 7/2010 | Keefer et al. |
| 8,256,524 | B2 | 9/2012 | Bleil et al. |
| 2003/0113594 | A1 | 6/2003 | Pearson |
| 2003/0186093 | A1 | 10/2003 | St-Pierre et al. |
| 2005/0058860 | A1 | 3/2005 | Goebel |
| 2005/0221148 | A1* | 10/2005 | Goebel ............ H01M 8/04014 429/415 |
| 2007/0269695 | A1 | 11/2007 | Yamazaki et al. |
| 2008/0070078 | A1* | 3/2008 | Gummalla ............ B64D 41/00 429/410 |
| 2008/0187785 | A1 | 8/2008 | Kwok |
| 2008/0213634 | A1 | 9/2008 | Grundel et al. |
| 2010/0018723 | A1* | 1/2010 | Bleil ................. A62C 3/08 169/45 |
| 2010/0297518 | A1 | 11/2010 | Wake et al. |
| 2010/0310955 | A1 | 12/2010 | Yadha et al. |
| 2011/0045368 | A1 | 2/2011 | Knoop |
| 2011/0111318 | A1 | 5/2011 | Bernard et al. |
| 2012/0082912 | A1 | 4/2012 | Hyde et al. |
| 2012/0210747 | A1 | 8/2012 | Hoffjann et al. |
| 2012/0292058 | A1 | 11/2012 | Bleil et al. |
| 2013/0206910 | A1 | 8/2013 | Stolte et al. |
| 2014/0004434 | A1 | 1/2014 | Saballus et al. |
| 2014/0203636 | A1 | 7/2014 | Goetz et al. |

FOREIGN PATENT DOCUMENTS

| | | |
|---|---|---|
| CN | 1790794 A | 6/2006 |
| CN | 1326276 C | 7/2007 |
| CN | 101304786 A | 11/2008 |
| CN | 100468841 C | 3/2009 |
| CN | 100502120 C | 6/2009 |
| CN | 102714326 A | 10/2012 |
| DE | 102011083453 A1 | 3/2013 |
| EP | 3136187 A2 | 4/1985 |
| EP | 1902954 A2 | 3/2008 |
| WO | 2007057188 A1 | 5/2007 |
| WO | 2013045139 A1 | 4/2013 |
| WO | 2013140152 A1 | 9/2013 |

OTHER PUBLICATIONS

International Patent Application No. PCT/CA2014/050175, International Preliminary Report on Patentability dated Dec. 3, 2015. 7 pages.
International Patent Application No. PCT/CA2014/050175, International Search Report and Written Opinion dated May 13, 2014. 8 pages.
International Patent Application No. PCT/CA2014/050188, International Preliminary Report on Patentability dated Dec. 3, 2015. 7 pages.
International Patent Application No. PCT/CA2014/050188, International Search Report and Written Opinion dated Jun. 11, 2014. 11 pages.
Keim et al., "Multifunctional Fuel Cell System in an Aircraft Environment: An Investigation Focusing on Fuel Tank Inerting and Water Generation," Aerospace Science and Technology, Apr. 2013, vol. 29, pp. 330-338.
European Application No. 14800988.9, Supplementary European Search Report dated Dec. 13, 2016. 6 pages.
Chinese Patent Application No. 201480035709.3, Office Action dated Jun. 11, 2018.
Chinese Patent Application No. CN201480035709.3, Office Action dated Nov. 27, 2017.
European Patent Application No. 14801196.8, Examination Report dated Aug. 30, 2017.
European Patent Application No. 14801196.8, Communication pursuant to Article 94(3) EPC dated Jul. 27, 2017.
U.S. Appl. No. 14/892,888, Non-Final Office Action dated Nov. 3, 2017.
U.S. Appl. No. 14/892,888, Final Office Action dated Apr. 25, 2018.

* cited by examiner

NITROGEN ENRICHED AIR GENERATION AND FUEL TANK INERTING SYSTEM

CROSS-REFERENCE TO RELATED APPLICATIONS

This application is a National Stage Entry of International Application No. PCT/CA2014/050188, filed Mar. 7, 2014, which is a non-provisional application of U.S. Application Ser. No. 61/827,318, filed May 24, 2013. International Application No. PCT/CA2014/050188 and U.S. Application Ser. No. 61/827,318 are incorporated by reference.

FIELD

This specification relates to inerting or fire suppression systems and methods, for example systems and methods to inert aircraft fuel tanks.

BACKGROUND

The ullage (space above a liquid fuel) of a fuel tank typically contains a mixture of fuel vapors and air. One method of reducing the risk of combustion in a fuel tank is to keep the oxygen concentration below a specified maximum concentration. FAA regulations introduced in 2008 require an oxygen concentration of 12% or less in some fuel tanks of some passenger aircraft. For military aircraft, the maximum oxygen concentration is typically lower, for example 9%.

Inerting systems decrease the probability of combustion in a fuel tank by displacing some of the oxygen with an inert gas, typically nitrogen. One inerting system in use in aircraft is known as the On-Board Inert Gas Generation System (OBIGGS). This system uses pressure from the aircraft engine compressor to drive air through a hollow fiber membrane module. The membranes are nitrogen selective and produce oxygen enriched air (OEA) and nitrogen enriched air (NEA). The system runs continuously while the engines are running. The NEA flows into the ullage and displaces air and vapors which are vented from the ullage to the atmosphere. A pressure swing adsorption (PSA) based NEA generator has also been proposed.

U.S. Pat. No. 8,256,524 describes a fire protection system which has a fuel cell for producing a nitrogen-enriched cathode exhaust air. The exhaust air is supplied to a room to be protected. A regulating or control unit controls at least one of an air supply of a cathode of the fuel cell, a fuel supply of the anode of the fuel cell, and the supply of nitrogen-enriched cathode exhaust air into the room.

Introduction

The following paragraphs intended to introduce the reader to the detailed description to follow and not to limit or define any claimed invention.

This specification describes an alternative system for generating nitrogen enriched air (NEA). The system may be used, for example, to inert a fuel tank, particularly a fuel tank on an aircraft. In some cases, the system can operate independently from the aircraft engines. Optionally, the NEA may be used to suppress fire in other parts of an aircraft, for example a cargo hold.

The NEA generation system uses a fuel cell power module (FCPM), for example a polymer electrolyte membrane (PEM) based FCPM. The FCPM also generates electricity, which may be used to supply power to any electrical load on the aircraft. The FCPM also generates NEA which can be used to inert a fuel tank or suppress fire as described above.

In one system, a portion of the FCPM exhaust air is recirculated to its air inlet. This causes the FCPM to exhaust air with a lower oxygen concentration. However, a required flow rate through the air side of the FCPM is maintained. The rate of recirculation of air exhaust to air inlet can be controlled so as to provide exhaust air with an oxygen concentration below a selected maximum under various operating conditions. The maximum may be varied according to the need for inerting.

DETAILED DESCRIPTION

Figure 1:
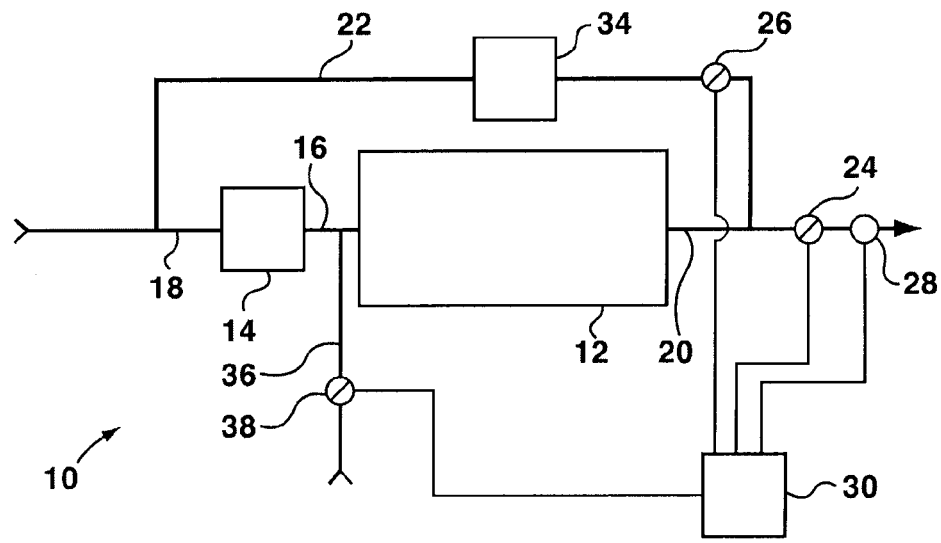
FIG. 1 is a schematic drawing of a fuel cell power module.

Currently, most airliners provide electrical power and compressed air for their non-propulsion systems from their primary engines while in flight and from an auxiliary power unit (APU) while on the ground. While in flight, compressed air is bled off from the compressor stage of the primary engines and distributed through the cabin. Cabin pressure is regulated by an outflow valve. Electrical energy is generated by a generator powered by the primary engines. The APU is typically a small gas turbine engine that also produces electricity and compressed air. The APU is primarily operated on the ground but may be used in flight in an emergency.

The APU is typically only about 15% efficient at converting fuel into electricity and engine and aircraft design is complicated by using the primary engines to generate compressed air and electricity. In order to increase efficiency or provide simpler systems, there have been various proposals to remove non-propulsion loads from the primary engines and to replace APUs with more efficient technology. In one example, the Boeing 787 uses electric compressors as used in piston-engine aircraft to provide compressed air for cabin pressurization. Various proposals for the 'more electric airplane' or 'all electric airplane' suggest transferring some or all of the electric loads in flight from the primary engines to an APU. In another example, the German Aerospace Center is installing a hydrogen fuel cell in an Airbus A320 to provide auxiliary electrical power on the ground to reduce the electrical load placed on the conventional APU.

At least two small aircraft have flown with PEM fuel cells powered by hydrogen. In these cases, the hydrogen was carried on board the aircraft as hydrogen, in at least one case in liquefied form. However, hydrogen can also be created from kerosene. The European Commission has funded a project, called GreenAir, to develop systems to generate hydrogen from kerosene based jet fuel continuously on board an aircraft. It has been at least proposed that a solid-oxide fuel cell (SOFC) can also be operated in aircraft. A SOFC can be configured to run on jet fuel directly.

A fuel cell fed with air as a source of oxygen naturally produces nitrogen enriched air (NEA) by consuming oxygen. However, the concentration of oxygen in the exhaust is likely to be too high to use the NEA as an inerting gas. This is because an excess of air, relative to the amount of air would carry a stoichiometric amount of oxygen to react with hydrogen, flows through the fuel cell stack. The excess air serves to remove moisture from the fuel cell stack and to help ensure that local areas within the flow fields of the fuel cell stack are not starved of oxygen. Localized flooding or oxygen deprivation in any part of the flow fields of a fuel cell stack will damage the stack. The amount of excess air typically specified in a PEM fuel cell power module to avoid damage is in the range of 1.5 to 3 times the amount of air that would carry a stoichiometric amount of oxygen. For brevity, this excess amount of air will be described as "N times the stoichiometric amount."

With the lowest amount of air mentioned above, 1.5 times the stoichiometric amount, the exhaust air has an oxygen concentration of about 8%. This is below the maximum oxygen concentration allowed in the ullage of an aircraft fuel tank. However, this mode of operation can only be maintained in some conventional PEM fuel cell power modules (FCPM) and, even in those devices, when operating near full power. Some fuel cell modules are not capable of operating at less than, for example, 2 times the stoichiometric amount. Further, a fuel cell that can operate at 1.5 times the stoichiometric amount at full power is likely to require closer to 2 or 3 times the stoichiometric amount of air when operating at reduced power. In these cases, the exhaust air will have about 12-15% oxygen which is close to or above the maximum oxygen concentration allowed in the ullage of an aircraft fuel tank. Considering that an aircraft fuel tank takes in ambient air when the aircraft descends, and this ambient air must be diluted quickly to keep the ullage below the maximum oxygen concentration, NEA for use in inerting aircraft fuel tanks preferably has about 10% oxygen or less even for civil aircraft. Military aircraft require NEA with even lower oxygen content. Accordingly, while a fuel cell always produces NEA as its exhaust gas, the exhaust gas is not always useful for fuel tank inerting. Further, merely limiting the flow of air to the FCPM is not an acceptable solution because it is likely to damage the fuel cell stack.

In a FCPM to be described in more detail below, there is a bypass line between a cathode (air) side exhaust from the fuel cell stack to a cathode (air) side inlet of the fuel cell stack. At least one controllable device is configured to allow the flow rate through the by-pass line to be altered. A controller is provided to control the controllable device. A method involves varying the rate of recirculation of air exhaust to air inlet so as to provide a desired oxygen concentration in the exhaust gas. The exhaust gas can be used as a fuel tank inerting medium or fire suppressant, for example in an aircraft.

FIG. 1 shows a fuel cell power module (FCPM) 10. The system 10 includes a fuel cell stack 12, an air blower 14, an air inlet 16, a blower inlet line 18, an air outlet line 20, a recirculation line 22, an exhaust valve 24, a recirculation valve 26, an oxygen concentration sensor 28 and a controller 30. Optionally, there may be a dehumidifier or condenser 34 in the recirculation line 22. The FCPM 10 also contains several other conventional elements, such as a hydrogen (or hydrogen containing fuel) supply, that are not shown in FIG. 1 to allow the more material elements of the FCPM 10 to be emphasized. The configuration of the elements in system 10 may be altered. For example, there might be only one of the exhaust valve 24 and bypass valve 26. In another example, a similar system might be arranged with the air blower 14 attached to the air outlet line 20. Optionally, the air inlet 16 may receive pre-compressed air from the cabin or directly from the primary engines or APU of an aircraft and in some configurations the blower 14 is not required to compress incoming air.

In the FCPM 10 as shown, air can be permitted to flow through the recirculation line 22 by opening recirculation valve 26. With recirculation valve 26 at least partially open, the difference in pressure between the air outlet line 20 and the suction side of blower 14 causes flow in the recirculation line 22. The flow through the recirculation line 22 can be increased by opening recirculation valve 26 or decreased by closing recirculation valve 26. When the recirculation valve 26 is at least partially open, closing exhaust valve 24 increases the flow in the recirculation line 22 and opening exhaust valve 24 decreases flow in the recirculation line 22. Accordingly, one or both of exhaust valve 24 and recirculation valve 26 can be modulated to vary the flow rate in the recirculation line 22.

When operating in an aircraft, the FCPM 10 as described above may be configured to receive air from the cabin into the blower inlet line 18 while the air outlet line 20 is separated from low pressure air at altitude, for example by a pressure regulator. In this case, the blower 14 can be used to provide a flow of air through the fuel cell stack and flow in the recirculation line 22 from the air outlet line 20 to the air inlet 16 at altitude as if the FCPM 10 were operating on the ground. Alternatively, the FCPM 10 may have its air inlet 16 connected to a compressor on the primary engines or an APU. In another alternative, a FCPM 10 receiving air from the cabin has its air outlet line 20 exposed at altitude to pressure substantially less than cabin pressure. In either of these or other possible configurations, the blower 14 might not be required to flow air through the fuel cell stack 12, or the blower 14 might not be required at all times. A blower 14 can instead, or additionally, be provided in the recirculation line 22 if required in a particular configuration to provide flow from the air outlet line 20 to the air inlet 16. Control of flow in the recirculation line can be provided by modulating the speed of a blower 14 in the recirculation line 22, optionally in combination with movements of one or both of the exhaust valve 24 and recirculation valve 26.

Varying the flow rate in the recirculation line 22 varies the oxygen concentration in air exhausted from the FCPM 10 through the air outlet line 20. Air in the air outlet line 20 has a reduced oxygen concentration due to the reaction of oxygen with hydrogen in the fuel cell stack 12. When some of this air is recirculated to the air inlet 16, preferably without increasing the total mass flow rate of air through the fuel cell stack 12, additional oxygen is consumed. The concentration of oxygen in the air outlet line 20 is reduced. However, the flow of air through the fuel cell stack 12 remains adequate to remove water from the fuel cell stack 12 and to prevent local oxygen starvation. In theory, the mix of fresh and recirculated air supplied to the air inlet 16 only needs at least one stoichiometric amount of oxygen if there is adequate mass flow rate of air to remove moisture as required. However, for various practical reasons, the minimum oxygen amount is typically higher, for example 1.02 or 1.05 or 1.1 or 1.2 times the stoichiometric amount, regardless of the mass flow rate of gasses through the cathode side of the fuel cell stack 12. For example, the cathode side flow field typically has many distinct pathways, and these pathways are not all exactly the same length. The controller 30 may be programmed to maintain at least a specified minimum multiple of the stoichiometric amount of oxygen, a minimum mass flow rate of gasses through the cathode side of the fuel cell stack 12, or both.

Increasing flow in the recirculation line 22 also tends to increase humidity in the fuel stack 12. Excess humidity can be removed using the optional dehumidifier 34. Alternatively, excess humidity can be removed by increasing a temperature set point or range for the fuel cell stack 12. A higher operating temperature causes water to evaporate into air flowing through the fuel cell stack 12 at a higher rate. The temperature variation may be controlled automatically in response to a signal indicating the humidity of the hydrogen side recirculation loop, as described in US Patent Publication US 2013295475A1 which is incorporated by reference. NEA exhausted from the FCPM 10 is preferably dehumidified before it is used, particularly if it is used for fuel tank inerting. In another option, the recirculation line 22 is connected to the air outlet line 20 downstream of a humidifier that also reduces the humidity of NEA exhausted from the FCPM 10 and used for inerting or fire suppression. However, the recirculation line 22 is preferably connected to the air outlet line 20 close to the FCPM 10 and in any event upstream of the fuel tank, cargo area or other space intended to receive the NEA. The NEA may optionally be adjusted in temperature or pressure if required before reaching the fuel tank, cargo area or other space intended to receive the NEA. Water created by the FCPM 10 can be used, for example, as toilet flush water in the aircraft or for other non-potable uses.

To enable real time control, one or more of the valves 24, 26 or blower 14 are connected to a controller 30. The controller 30 may be programmed to vary the flow in the recirculation line 22 in a pre-determined manner based on a stored formula or table giving the valve movements or blower speed predicted to provide exhaust air below a maximum oxygen concentration under a range of operating conditions. Optionally, the controller 30 is connected to an oxygen concentration sensor 28 to allow for a feedback or other control loop. Flow in the recirculation line 22 is increased if oxygen concentration is above a threshold or range and decreased if oxygen concentration is below a threshold or range. In particular, the controller 30 may be programmed with a maximum exhaust air oxygen concentration, for example 10%, or a desired exhaust air oxygen concentration range, for example between 9% and 11%. If a higher oxygen concentration is measured in the exhaust gas, then one of the controllable devices is modulated to increase the recirculation rate until the desired exhaust gas oxygen concentration is reached, preferably subject to maintaining minimum operating conditions as described above. A concentration range is preferred over a single set point because operating at low multiples of the stoichiometric amount of oxygen may limit the electrical power produced by the FCPM 10.

Optionally, an altitude or pressure signal may be used to adjust the maximum exhaust air concentration or desired concentration range. For example, when an aircraft is descending, ambient air is drawn into the fuel tanks and must be diluted. The controller 30 adjusts the maximum exhaust gas oxygen concentration, or desired oxygen concentration range, downwards while a signal indicates that the aircraft is descending.

Figure 2:
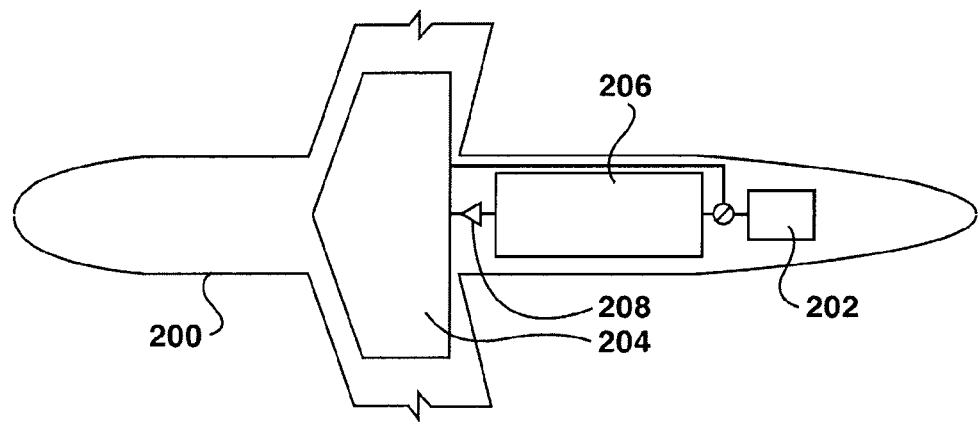
FIG. 2 is a schematic drawing of an aircraft having a fuel cell power module.

FIG. 2 shows an aircraft 200 having an NEA generator 202. The NEA generator 202 may be a FCPM 10 as shown in FIG. 1. The NEA generator 202 may send NEA to one or more fuel tanks 204, to a baggage hold 206, or both. The baggage hold 206 is substantially sealed from parts of the cabin containing people or animals. NEA is sent to the fuel tank 204 unless or until the ullage has less than 12% oxygen. Additional NEA is then diverted to the baggage hold 206. The NEA reduces risk of fires or explosions in the baggage hold 206.

In addition, when an aircraft descends, ambient air is rapidly drawn into the fuel tank 204. Depending on the relative sizes of the NEA generator 202 and the fuel tank 204, it may be difficult for the NEA generator 202 to displace the oxygen in the ambient air entering the fuel tank 204 fast enough to maintain fire safe conditions in the fuel tank 204. The fuel tank in this instance draws NEA from the baggage hold 206, for example through one way valve 208, optionally while also receiving NEA from NEA generator 202. In this way, the baggage hold 206 acts as an NEA reservoir for the fuel tank 204.

We claim:

1. A fuel cell power module having a cathode side exhaust outlet connected (i) to a recirculation line connected to a cathode side inlet and (ii) to a fuel tank, baggage hold or other area requiring inerting or fire suppression and having a controller connected to at least one controllable device operable by the controller, wherein the controller is programmed to adjust the flow rate in the recirculation line so as to keep the oxygen or nitrogen concentration in the cathode side exhaust within a specified range, below a specified oxygen threshold or above a specified nitrogen threshold.

2. The fuel cell power module of claim 1 having a nitrogen or oxygen concentration sensor in communication with the cathode side exhaust outlet and the controller.

3. The fuel cell power module of claim 1 having an ambient pressure or altitude sensor connected to the controller and wherein the controller is configured to increase the flow rate in the recirculation line when the ambient pressure increases or the altitude is decreased.

4. A method of operating a fuel cell power module comprising steps of recirculating cathode side exhaust to a cathode side inlet, monitoring the nitrogen or oxygen concentration of the cathode side exhaust, and adjusting a recirculation rate of the cathode side exhaust considering the monitored concentration, using a controller programmed to adjust the recirculation rate, such that the cathode side exhaust is recirculated in an amount sufficient to keep the oxygen or nitrogen concentration of the cathode side exhaust within a specified range, above a specified nitrogen threshold or below a specified oxygen threshold, and further comprising a step of supplying a portion of the cathode side exhaust to a fuel tank or baggage hold.

5. The method of claim 4 wherein the specified range or specified threshold is suitable for fire suppression or fuel tank inerting.

6. The fuel cell power module of claim 1 wherein the cathode side exhaust outlet is connected to a fuel tank.

7. The fuel cell power module of claim 1 wherein the controller is programmed to maintain at least a specified minimum multiple of the stoichiometric amount of oxygen, a minimum mass flow rate of gasses through the cathode side of the fuel cell stack, or both.

8. The fuel cell power module of claim 1 wherein the fuel cell power module is located in an aircraft and the controller is programmed to adjust the specified oxygen threshold or the specified range downwards while the aircraft is descending.

9. The fuel cell power module of claim 1 wherein the cathode side exhaust outlet is connected to a baggage hold and a fuel tank of an aircraft and the baggage hold is connected to the fuel tank.

10. The method of claim 4 wherein the fuel cell power module is located in an aircraft and further comprising a step of reducing the specified range or threshold when the aircraft is descending.

11. The method of claim 4 wherein the specified range is between 9% and 11% and the specified threshold is 10%.

12. The fuel cell power module of claim 1 wherein the controllable device is located in the recirculation line.

13. The method of claim 4 further comprising flowing a portion of the cathode side exhaust to a fuel tank or baggage hold or both of an aircraft, wherein another portion of the cathode side exhaust is recirculated from upstream of the fuel tank or baggage hold.

14. The method of claim 4 further comprising flowing cathode side exhaust to a fuel tank unless or until the ullage of the fuel tank has less than 12% oxygen and then flowing cathode side exhaust to a baggage hold.

\* \* \* \* \*